US012756303B2

(12) United States Patent
Takagi et al.

(10) Patent No.: US 12,756,303 B2

(45) Date of Patent: Oct. 6, 2026

(54) RESONANT CONVERTER WITH MULTIPLE CONVERSION CIRCUITS

(71) Applicant: GS Yuasa International Ltd., Kyoto (JP)

(72) Inventors: Kazuto Takagi, Kyoto (JP); Yuki Aoyagi, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 121 days.

(21) Appl. No.: 18/865,066

(22) PCT Filed: May 11, 2023

(86) PCT No.: PCT/JP2023/017712
§ 371 (c)(1),
(2) Date: Nov. 12, 2024

(87) PCT Pub. No.: WO2023/219128
PCT Pub. Date: Nov. 16, 2023

(65) Prior Publication Data

US 2025/0317053 A1 Oct. 9, 2025

(30) Foreign Application Priority Data

May 12, 2022 (JP) ................................ 2022-078570

(51) Int. Cl.
*H02M 3/335* (2006.01)
*H02M 1/00* (2006.01)
*H02M 3/00* (2006.01)

(52) U.S. Cl.
CPC ........... *H02M 3/01* (2021.05); *H02M 1/0009* (2021.05); *H02M 3/33569* (2013.01); *H02M 3/33571* (2021.05)

(58) Field of Classification Search
CPC .. H02M 3/01; H02M 1/0009; H02M 3/33569; H02M 3/285; H02M 3/33571;
(Continued)

(56) References Cited

U.S. PATENT DOCUMENTS 9,106,141 B2 * 8/2015 Hosotani ........... H02M 3/33576
9,780,678 B2 10/2017 Adragna et al.
(Continued)

FOREIGN PATENT DOCUMENTS

JP 2002095252 A 3/2002
JP 2015023760 A 2/2015
(Continued)

OTHER PUBLICATIONS

International Search Report and Written Opinion for Patent Cooperation Treaty Application No. PCT/JP2023/017712, dated Jul. 25, 2023, 9 pages.

*Primary Examiner* — Yusef A Ahmed
(74) *Attorney, Agent, or Firm* — Buchalter LLP

(57) ABSTRACT m lower conversion circuits configuring an LLC resonant converter that operates by on and off operations of an upper switch element and a lower switch element together with a resonant inductor is included. n upper conversion circuits configuring an LLC resonant converter in which a primary winding and a resonant capacitor operate together with a resonant inductor by the on and off operations of the upper switch element and the lower switch element is included. A lower adjustment inductor connected in parallel with the primary windings of the m lower conversion circuits and an upper adjustment inductor connected in parallel with the primary windings of n lower conversion circuits.

14 Claims, 8 Drawing Sheets

(58) Field of Classification Search
CPC .. H02M 1/0058; H02M 3/28; H02M 3/33573; H02M 3/1584; Y02B 70/10; Y02P 80/10
See application file for complete search history.

(56) References Cited

U.S. PATENT DOCUMENTS

| | | | | |
|---|---|---|---|---|
| 2008/0298093 | A1 | 12/2008 | Jin | |
| 2010/0026095 | A1* | 2/2010 | Phadke | H02M 3/285 307/31 |
| 2010/0328968 | A1* | 12/2010 | Adragna | H02M 3/01 363/21.02 |
| 2011/0069514 | A1* | 3/2011 | Chiba | H02M 3/01 363/21.02 |
| 2014/0362616 | A1 | 12/2014 | An | |
| 2016/0254756 | A1* | 9/2016 | Yang | H01F 27/2823 363/21.02 |
| 2018/0138801 | A1* | 5/2018 | Chen | H01F 27/2804 |
| 2018/0351469 | A1 | 12/2018 | Kakalashvili | |
| 2019/0043660 | A1* | 2/2019 | Jin | H02M 3/33592 |
| 2019/0043661 | A1* | 2/2019 | Jin | H01F 27/346 |
| 2019/0052180 | A1* | 2/2019 | Meneses Herrera | H02M 3/33592 |
| 2019/0058408 | A1* | 2/2019 | Hao | H02M 3/01 |
| 2019/0157978 | A1* | 5/2019 | Ni | H02M 1/14 |
| 2021/0408927 | A1* | 12/2021 | Zhang | H02M 3/33592 |
| 2022/0103081 | A1* | 3/2022 | Sheng | H02M 1/0058 |
| 2022/0103083 | A1* | 3/2022 | Zhou | H02M 1/0054 |
| 2022/0286055 | A1* | 9/2022 | Baranwal | H02J 7/06 |
| 2023/0223856 | A1* | 7/2023 | Sato | H02M 3/285 363/21.02 |
| 2023/0361679 | A1* | 11/2023 | Peluso | H02M 3/1586 |
| 2024/0079952 | A1* | 3/2024 | Chen | H02M 3/285 |
| 2024/0079965 | A1* | 3/2024 | Chen | H02M 3/015 |
| 2025/0047210 | A1* | 2/2025 | Chiba | H02M 3/33571 |
| 2025/0167688 | A1* | 5/2025 | Lin | H02M 3/33571 |
| 2025/0202375 | A1* | 6/2025 | Chiba | H02M 3/01 |
| 2025/0317066 | A1* | 10/2025 | Takagi | H02M 1/0064 |
| 2026/0025067 | A1* | 1/2026 | Takagi | H02M 3/01 |

FOREIGN PATENT DOCUMENTS

| | | | |
|---|---|---|---|
| JP | 6161982 | B2 | 7/2017 |
| JP | 2019080390 | A | 5/2019 |
| JP | 6696617 | B1 | 5/2020 |
| JP | 2021045030 | A | 3/2021 |
| JP | 2021153382 | A | 9/2021 |
| WO | WO 2012/101905 | A1 | 8/2012 |

* cited by examiner

RESONANT CONVERTER WITH MULTIPLE CONVERSION CIRCUITS

CROSS REFERENCE TO RELATED APPLICATIONS

This application is a National Stage Application, filed under 35 U.S.C. § 371, of International Application No. PCT/JP2023/017712, filed May 11, 2023, which international application claims priority to and the benefit of Japanese Application No. 2022-078570, filed May 12, 2022; the contents of both of which as are hereby incorporated by reference in their entireties.

BACKGROUND

Technical Field

The present invention relates to a resonant converter that converts an input voltage into an output voltage.

Description of Related Art

A resonant converter that includes a conversion circuit including a resonant circuit, a transformer, and a rectifier above and below a switching leg is known (for example, see Patent Document JP-B2-6161982).

BRIEF SUMMARY

In order to further achieve large power of the resonant converter, or in order to highly integrate the circuit while maintaining the power, it is conceivable to increase the number of conversion circuits and expand the conversion circuits in parallel. However, when excitation inductance of the transformer varies, there is a problem that currents are not balanced among a plurality of conversion circuits.

An aspect of the present invention is to provide a resonant converter that can easily achieve the large power or the high integration.

A resonant converter according to an aspect of the present invention includes: an upper switch element and a lower switch element that are connected in series between a positive electrode and a negative electrode of a DC power supply; and a resonant inductor including one end connected to a connection point between the upper switch element and the lower switch element.

The resonant converter includes m, where m is an integer greater than or equal to 0, lower conversion circuits each of which includes a transformer including a primary winding and a secondary winding, a resonant capacitor connected in series to the primary winding, and a rectifier connected to both ends of the secondary winding.

The m lower conversion circuits configure an LLC resonant converter in which the primary winding and the resonant capacitor are connected between the other end of the resonant inductor and the negative electrode of the DC power supply, the LLC resonant converter operating by on and off operations of the upper switch element and the lower switch element together with the resonant inductor.

The resonant converter includes n, where n is an integer greater than or equal to 0, and at least one of m and n is greater than or equal to 2, upper conversion circuits each of which includes the transformer, the resonant capacitor, and the rectifier.

The n upper conversion circuits configure an LLC resonant converter in which the primary winding and the resonant capacitor are connected between the other end of the resonant inductor and the positive electrode of the DC power supply, the LLC resonant converter operating together with the resonant inductor by the on and off operation of the upper switch element.

The resonant converter includes a lower adjustment inductor connected in parallel with the primary windings of the m lower conversion circuits and an upper adjustment inductor connected in parallel with the primary windings of the n upper conversion circuits.

DETAILED DESCRIPTION OF VARIOUS EMBODIMENTS

Figure 1:
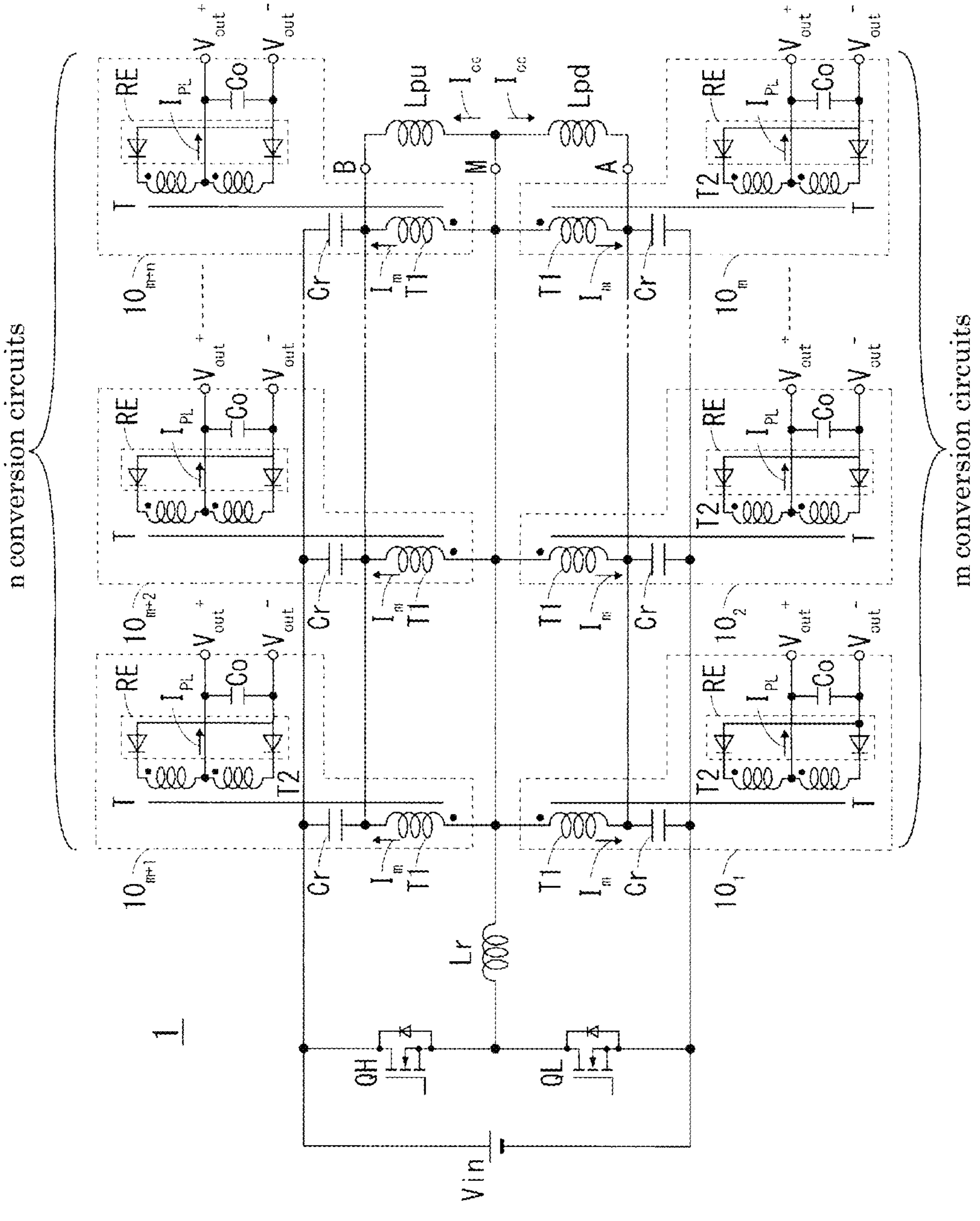
FIG. 1 is a view illustrating a circuit configuration of a resonant converter according to an embodiment.

Hereinafter, an embodiment of the present invention will be described with reference to the drawings. In the following embodiment, the same reference numeral is given to the configuration indicating the same function, and the description thereof is appropriately omitted.

Referring to FIG. 1, in a resonant converter 1 of the embodiment, an upper switch element QH and a lower switch element QL are connected in series as a switching leg between a positive electrode of a DC power supply Vin and a negative electrode of the DC power supply Vin. For example, each of the upper switch element QH and the lower switch element QL includes a field effect transistor (FET). Each of the upper switch element QH and the lower switch element QL has a body diode between a source and a drain.

The upper switch element QH connected to the positive electrode of the DC power supply Vin is an upper arm of the switching leg. The lower switch element QL connected to the negative electrode side of the DC power supply Vin is a lower arm of the switching leg.

The resonant converter 1 includes a resonant inductor Lr including one end connected to a connection point between the upper switch element QH and the lower switch element QL.

The resonant converter 1 includes m+n conversion circuits $\mathbf{10}_1$ to $\mathbf{10}_{m+n}$ each of which includes a transformer T, a resonant capacitor Cr, and a rectifier RE. m and n are integers greater than or equal to 0, and one of m and n is greater than or equal to 2.

In the m conversion circuits $\mathbf{10}_1$ to $\mathbf{10}_m$, a primary winding T1 of each transformer T and the resonant capacitor Cr are connected in series between the other end of the resonant inductor Lr and the negative electrode of the DC power supply Vin. In the m conversion circuits $\mathbf{10}_1$ to $\mathbf{10}_m$, one end of the primary winding T1 of each transformer T is connected to the other end of the resonant inductor Lr, and the other end of the primary winding T1 of the transformer T is connected to the negative electrode of the DC power supply Vin through the resonant capacitor Cr. That is, the primary winding T1 and the resonant capacitor Cr of each transformer T of the conversion circuits $\mathbf{10}_1$ to $\mathbf{10}_m$ configure an LLC resonant converter that operates by an on and off operation of the switching leg using the common resonant inductor Lr. Hereinafter, the m conversion circuits $\mathbf{10}_1$ to $\mathbf{10}_m$ provided in the lower arm are referred to as lower conversion circuits $\mathbf{10}_{1\ to\ m}$.

In the n conversion circuits $\mathbf{10}_{m+1}$ to $\mathbf{10}_{m+n}$, the primary winding T1 of each transformer T and the resonant capacitor Cr are connected in series between the other end of the resonant inductor Lr and the positive electrode of the DC power supply Vin. In the n conversion circuits $\mathbf{10}_{m+1}$ to $\mathbf{10}_{m+n}$, one end of the primary winding T1 of each transformer T is connected to the other end of the resonant inductor Lr, and the other end of the primary winding T1 of the transformer T is connected to the positive electrode of the DC power supply Vin through the resonant capacitor Cr. That is, the primary winding T1 and the resonant capacitor Cr of each transformer T of the conversion circuits $\mathbf{10}_1$ to $\mathbf{10}_m$ configure an LLC resonant converter that operates by an on and off operation of the switching leg using the common resonant inductor Lr. Hereinafter, the n conversion circuits $\mathbf{10}_{m+1}$ to $\mathbf{10}_{m+n}$ provided in the upper arm are referred to as upper conversion circuits $\mathbf{10}_{m+1\ to\ m+n}$.

In the m+n conversion circuits $\mathbf{10}_1$ to $\mathbf{10}_{m+n}$, the rectifier RE rectifies an AC current output from a secondary winding T2 of the transformer T and outputs the rectified AC current from a high potential output terminal $V_{out+}$ and a low potential output terminal $V_{out-}$. A circuit system such as center tap rectification, bridge rectification, voltage doubler rectification, and Cockcroft-Walton rectification can be adopted as the rectifier RE. In addition, the rectifier RE can also perform synchronous rectification using an FET instead of a diode. Each of the m+n conversion circuits $\mathbf{10}_1$ to $\mathbf{10}_{m+n}$ includes an output capacitor Co connected between the high potential output terminal $V_{out+}$ and the low potential output terminal $V_{out-}$, and the rectifier RE and the output capacitor Co configure a rectifying smoothing circuit.

When the m+n conversion circuits $\mathbf{10}_1$ to $\mathbf{10}_{m+n}$ are provided, the resonant converter 1 can achieve the large power, or highly integrate the circuits while keeping the power. However, when excitation inductance of the transformer T varies among the m+n conversion circuits $\mathbf{10}_1$ to $\mathbf{10}_{m+n}$, the currents are not balanced among the m+n conversion circuits $\mathbf{10}_1$ to $\mathbf{10}_{m+n}$. For example, when the excitation inductance of the transformer T of the conversion circuit $\mathbf{10}_1$ is smaller than that of the other conversion circuits 10, a period during which a load current IPL flows only in the conversion circuit $\mathbf{10}_1$ is generated immediately after the switching. This is because an excitation current $I_m$ flowing through the transformer T of the conversion circuit $\mathbf{10}_1$ is larger than that of the other conversion circuits 10 and the resonant capacitor Cr of the conversion circuit $\mathbf{10}_1$ is more charged. The excitation current $I_m$ is current that does not send power to the secondary winding T2 of the transformer T except for the load current IPL in the current flowing through the primary winding T1 of the transformer T.

Accordingly, the resonant converter 1 includes an adjustment inductor Lpd and an adjustment inductor Lpu, and adjusts a circulating current $I_{CC}$ corresponding to the excitation current of the conventional LLC resonant converter. In the resonant converter 1, the excitation inductance of the transformer T of each of the m+n conversion circuits $\mathbf{10}_1$ to $\mathbf{10}_{m+n}$ is set to be sufficiently larger (for example, greater than or equal to 10 times) than the inductance of the adjustment inductor, and the excitation current $I_m$ is sufficiently smaller than the circulating current $I_{CC}$.

Figure 2:
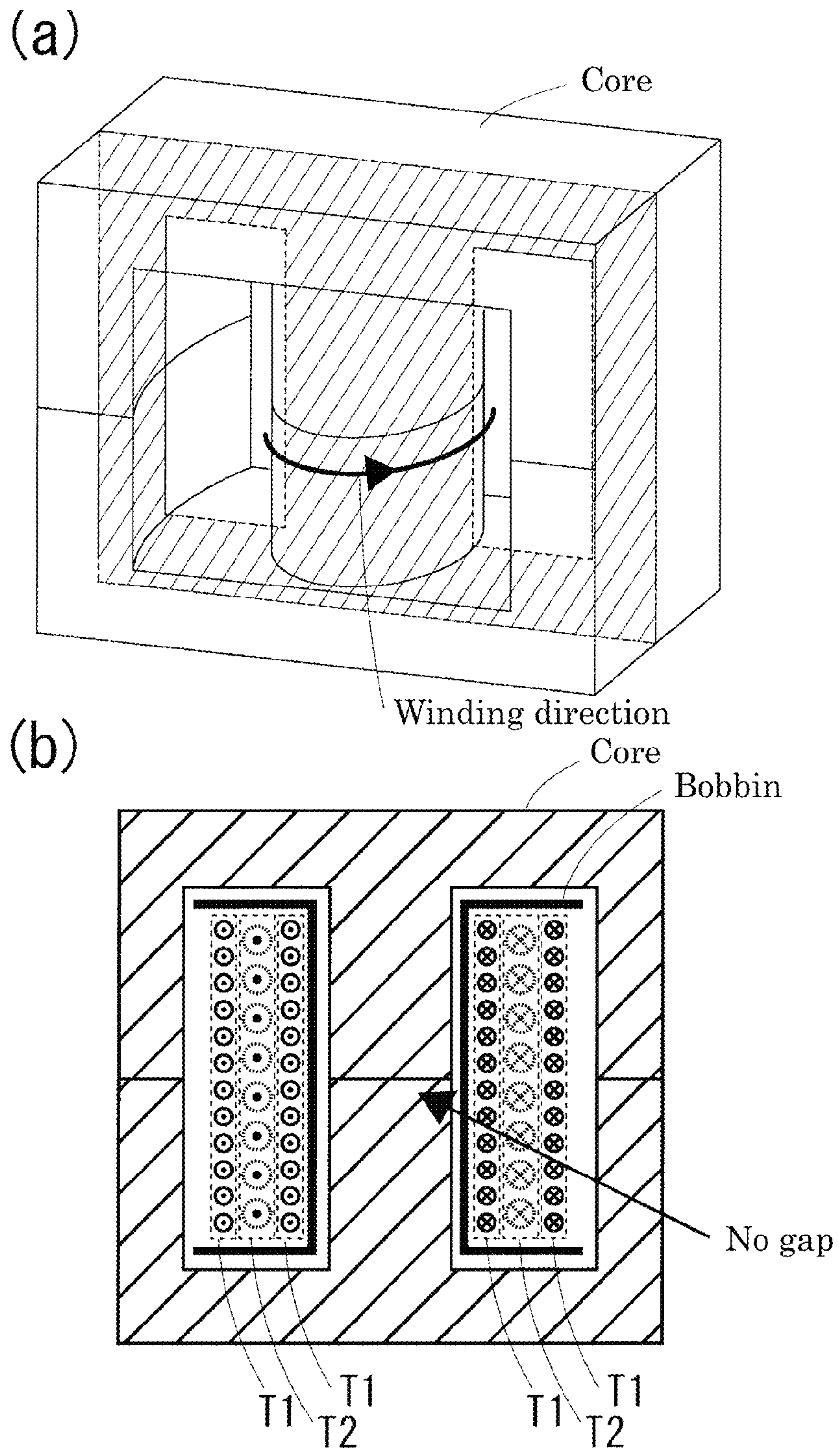
FIG. 2 is a view illustrating a configuration example of a transformer in FIG. 1.

As the transformer T, a gapless transformer as illustrated in FIG. 2 can be used because a gap is not required to be provided in the core to lower the excitation inductance. FIG. 2(*a*) is a perspective view of the core. FIG. 2(*b*) is a sectional view illustrating a shaded portion in FIG. 2(*a*). When the transformer T is used as gapless, because the adjustment of the gap is not required, productivity is improved. In the example illustrated in FIG. 2, the primary winding T1 and the secondary winding T2 are sandwiched and wound around a gapless EER core (two cores of E type with cylindrical middle legs are overlapped, and there is no gap between the middle legs). The core of the transformer T is not limited, but may be an EI core or a PQ core.

The adjustment inductor Lpd is connected in parallel with the primary winding T1 of the transformers T of the lower conversion circuits $\mathbf{10}_{1\ to\ m}$, and adjusts the circulating current $I_{CC}$ of the m LLC resonant converters formed in the lower arm. In other words, the transformers T of the lower conversion circuits $\mathbf{10}_{1\ to\ m}$ share the adjustment inductor Lpd that adjusts the circulating currents $I_{CC}$ of the m LLC resonant converters formed in the lower arm.

The adjustment inductor Lpu is connected in parallel with the primary winding T1 of the transformer T of the upper conversion circuits $\mathbf{10}_{m+1\ to\ m+n}$, and adjusts the circulating current $I_{CC}$ of the n LLC resonant converters formed in the upper arm. In other words, the transformers T of the upper conversion circuits $\mathbf{10}_{m+1}$ to min share the adjustment inductor Lpu that adjusts the circulating current $I_{CC}$ of the n LLC resonant converters formed in the upper arm.

The resonant converter 1 includes an external terminal M connected to a connection point between the other end of the resonant inductor Lr and one end of the primary winding T1 of the transformers T of the m+n conversion circuits $\mathbf{10}_1$ to $\mathbf{10}_{m+n}$. The resonant converter 1 includes an external terminal A connected to a connection point between the other ends of the primary windings T1 of the transformers T of the m lower conversion circuits $\mathbf{10}_{1\ to\ m}$ and one end of the resonant capacitor. The resonant converter 1 includes an external terminal B connected to a connection point between the other end of the primary winding T1 of the transformer T of the n upper conversion circuits $\mathbf{10}_{m+1}$ to min and one end of the resonant capacitor. The adjustment inductor Lpd is connected as an external inductor between the external terminal M and the external terminal A. The adjustment inductor Lpu is connected as an external inductor between the external terminal M and the external terminal B.

The resonant converter 1 can collectively adjust the circulating currents $I_{CC}$ of the m+n conversion circuits $\mathbf{10}_1$ to $\mathbf{10}_{m+n}$ only by adjusting the inductances of the adjustment inductor Lpd and the adjustment inductor Lpu. Consequently, in the resonant converter 1, the currents are balanced even when the conversion circuits $\mathbf{10}_1$ to $\mathbf{10}_{m+n}$ are extended in parallel, so that the large power or the high integration can be easily achieved.

The resonant converter 1 can adjust the circulating current $I_{CC}$ by the adjustment inductor Lpd and the adjustment inductor Lpu, so that the specification of the resonant converter 1 can be easily changed without rewinding the m+n transformers T.

In the resonant converter 1, a resonance current ir flowing through the primary side of the m+n conversion circuits $\mathbf{10}_1$ to $\mathbf{10}_{m+n}$ is superimposed by one resonant inductor Lr, and in the resonant inductor Lr, the current of (m+n) ir flows. Consequently, when inductance $L_1$ of the resonant inductor Lr in the case where the number of conversion circuits 10 is one and inductance $L_2$ of the resonant inductor Lr in the case where the number of conversion circuits 10 is (m+n) are compared to each other for voltage $v_L$ that is applied to the resonant inductor Lr, the following formula (1) is obtained.

[Mathematical formula 1]

$$v_L = L_l\frac{di_r}{dt} = L_2\frac{d(m+n)i_r}{dt} = \frac{L_l}{(m+n)}\frac{d(m+n)i_r}{dt} \tag{1}$$

The inductance $L_2$ of the resonant inductor Lr in the case where the number of conversion circuits 10 is (m+n) can be reduced to 1/(m+n) of the inductance $L_1$ of the resonant inductor Lr in the case where the number of conversion circuits 10 is one. Consequently, in the case where the number of conversion circuits 10 is (m+n), a size of the resonant inductor Lr can be reduced, and a planar structure or a coreless structure can be achieved.

In the resonant converter 1, because the resonant inductor Lr is common to the m+n conversion circuits $\mathbf{10}_1$ to $\mathbf{10}_{m+n}$, the balance of the current is not greatly impaired even when the capacitance $C_1$ to $C_{m+n}$ of the resonant capacitor Cr varies. As illustrated in the following formula (2), a resonance frequency $\omega_r$ is made uniform. In the formula (2), an average value of the capacitances $C_1$ to $C_{m+n}$ is Cr.

[Mathematical formula 2]

$$\omega_r = \frac{1}{\sqrt{\frac{L_r}{m+n}\sum_{j=1}^{m+n} C_j}} \approx \frac{1}{\sqrt{L_r C_r}} \tag{2}$$

Figure 3:
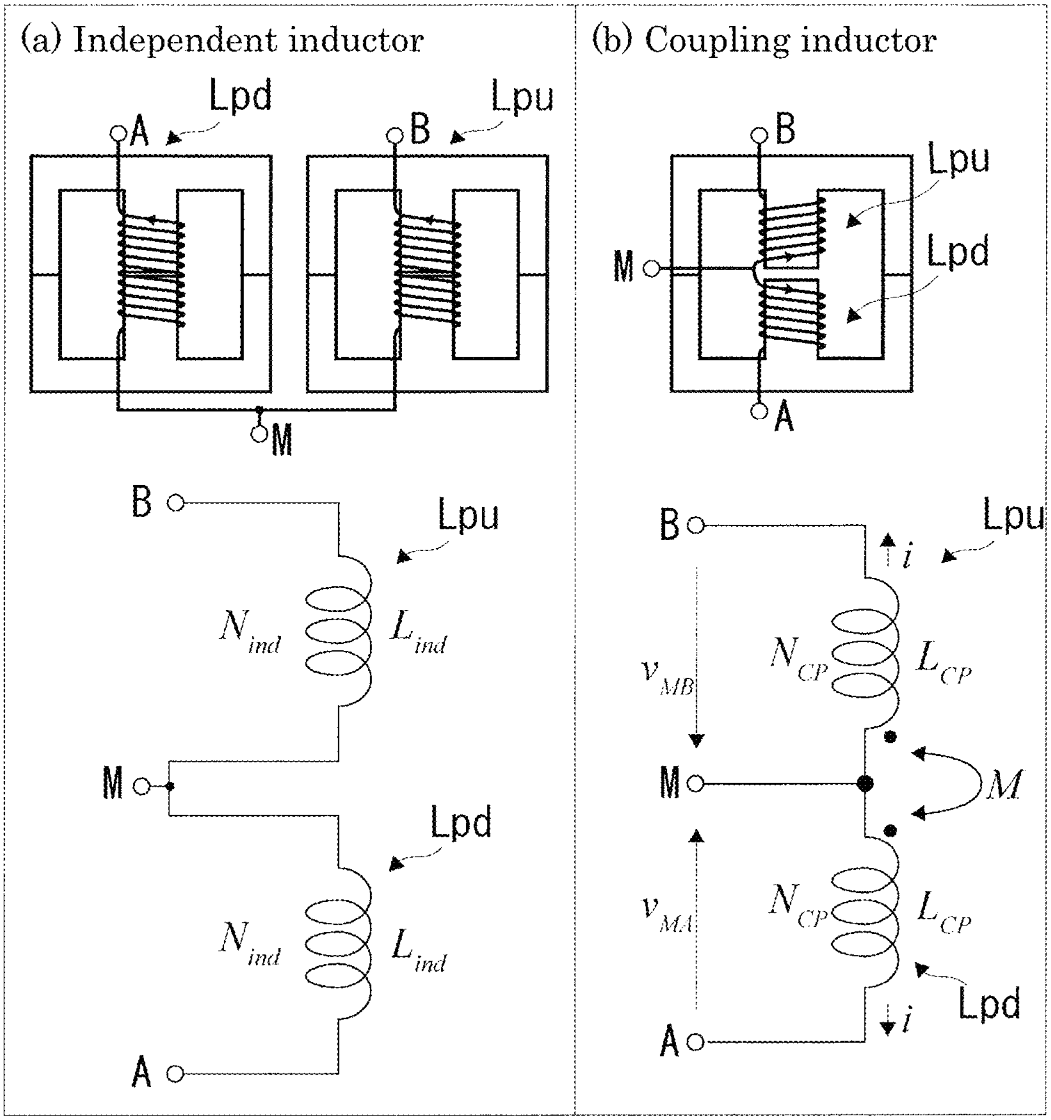
FIG. 3 is a view illustrating a configuration example of an adjustment inductor in FIG. 1.

As illustrated in FIG. 3(*a*), the adjustment inductor Lpd and the adjustment inductor Lpu may be independent inductors with the winding wound around each core, or as illustrated in FIG. 3(*b*), the adjustment inductor Lpd and the adjustment inductor Lpu may be a coupling inductor with the winding wound around the same core. Although the schematic view of the coupling inductor in FIG. 3(*b*) is illustrated as a split winding for convenience, a sandwich winding or a bifilar winding may be used practically.

When the adjustment inductor Lpd and the adjustment inductor Lpu are independent inductors, the number of lower conversion circuits $\mathbf{10}_{1\ to\ m}$ and the number of upper conversion circuits $\mathbf{10}_{m+1}$ to min are required to be the same (m=n). The inductance $L_{ind}$ can be expressed as $L_{ind}=N_{ind}^2/R$ using the number of turns $N_{ind}$ and the magnetic resistance R of the core.

In the case where the adjustment inductor Lpd and the adjustment inductor Lpu are the coupling inductor, the adjustment inductor Lpd and the adjustment inductor Lpu are formed into a union connection in which magnetic fluxes are applied when the current flows from the connection point of the windings to each of the windings (M→A, B). Thus, even when the number of lower conversion circuits $\mathbf{10}_{1\ to\ m}$ is different from the number of upper conversion circuits $\mathbf{10}_{m+1\ to\ m+n}$ (even when m≠n), the currents can be balanced among m+n conversion circuits $\mathbf{10}_1$ to $\mathbf{10}_{m+n}$.

When the adjustment inductor Lpd and the adjustment inductor Lpu are the coupling inductor, the resonant converter 1 also has the following effects.

The variation in inductance between the adjustment inductor Lpd and the adjustment inductor Lpu can be reduced.

The number of cores used for the adjustment inductor Lpd and the adjustment inductor Lpu may be one.

The number of windings of the adjustment inductor Lpd and the adjustment inductor Lpu can be reduced as compared with the case of independent inductors.

In the case of the coupling inductor, self-inductance $L_{CP}$ and mutual inductance M of each winding are obtained using the number of turns $N_{CP}$ and the magnetic resistance R of the core, and assuming that the self-inductance $L_{CP}$ and the mutual inductance M are densely coupled (k=1), the self-inductance $L_{CP}$ and the mutual inductance M are expressed as follows.

$$L_{CP} = N_{CP}^2/R$$

$$M = kN_{CP}N_{CP}/R = L_{CP}$$

When current i flows from the connection point of the windings to each of the windings, inter-terminal voltages $V_{MA}$, $V_{MB}$ of the coupling inductor satisfy the following equation:

$$V_{MA} = V_{MB} = (L_{CP} + M)\,di/dt = 2L_{CP}\,di/dt,$$

and combined inductance for the current i in each winding is twice the self-inductance $L_{CP}$.

Consequently, in order to obtain the inductance equal to that of the independent inductor in the coupling inductor ($L_{ind}=2L_{CP}$), the number of turns $N_{CP}$ of the winding in the coupling inductor may be $N_{CP}=N_{ind}/\sqrt{2}$. That is, when the magnetization curves are linear and the magnetoresistance is equal, the number of turns $N_{CP}$ of the windings in the coupling inductor can be reduced to $1/\sqrt{2}$ (=0.71) compared to the number of turns $N_{ind}$ of the windings in the independent inductor.

Figure 4:
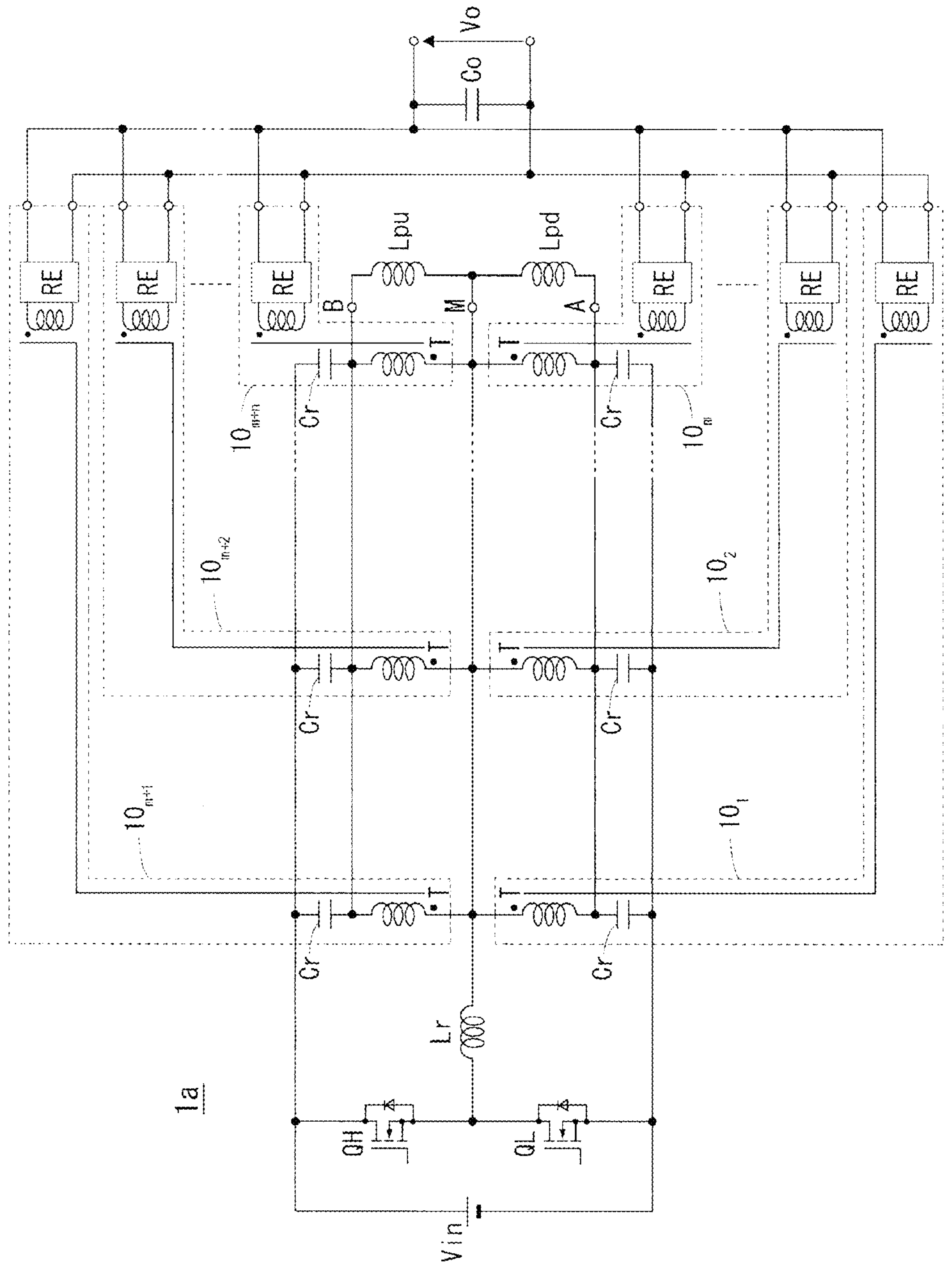
FIG. 4 is a view illustrating a configuration example in which outputs of conversion circuits are connected in parallel.

In a resonant converter 1*a* illustrated in FIG. 4, outputs of the m+n conversion circuits $\mathbf{10}_1$ to $\mathbf{10}_{m+n}$ are connected in parallel, and an output capacitor Co is collectively connected to a total output Vo. The adjustment inductor Lpd and the adjustment inductor Lpu may be the independent inductors or the coupling inductor. The output capacitor Co may be divided and connected to each of the m+n conversion circuits $\mathbf{10}_1$ to $\mathbf{10}_{m+n}$. The resonant converter 1*a* can easily achieve the large current of the output by connecting the outputs from the m+n conversion circuits $\mathbf{10}_1$ to $\mathbf{10}_{m+n}$ in parallel.

Figure 5:
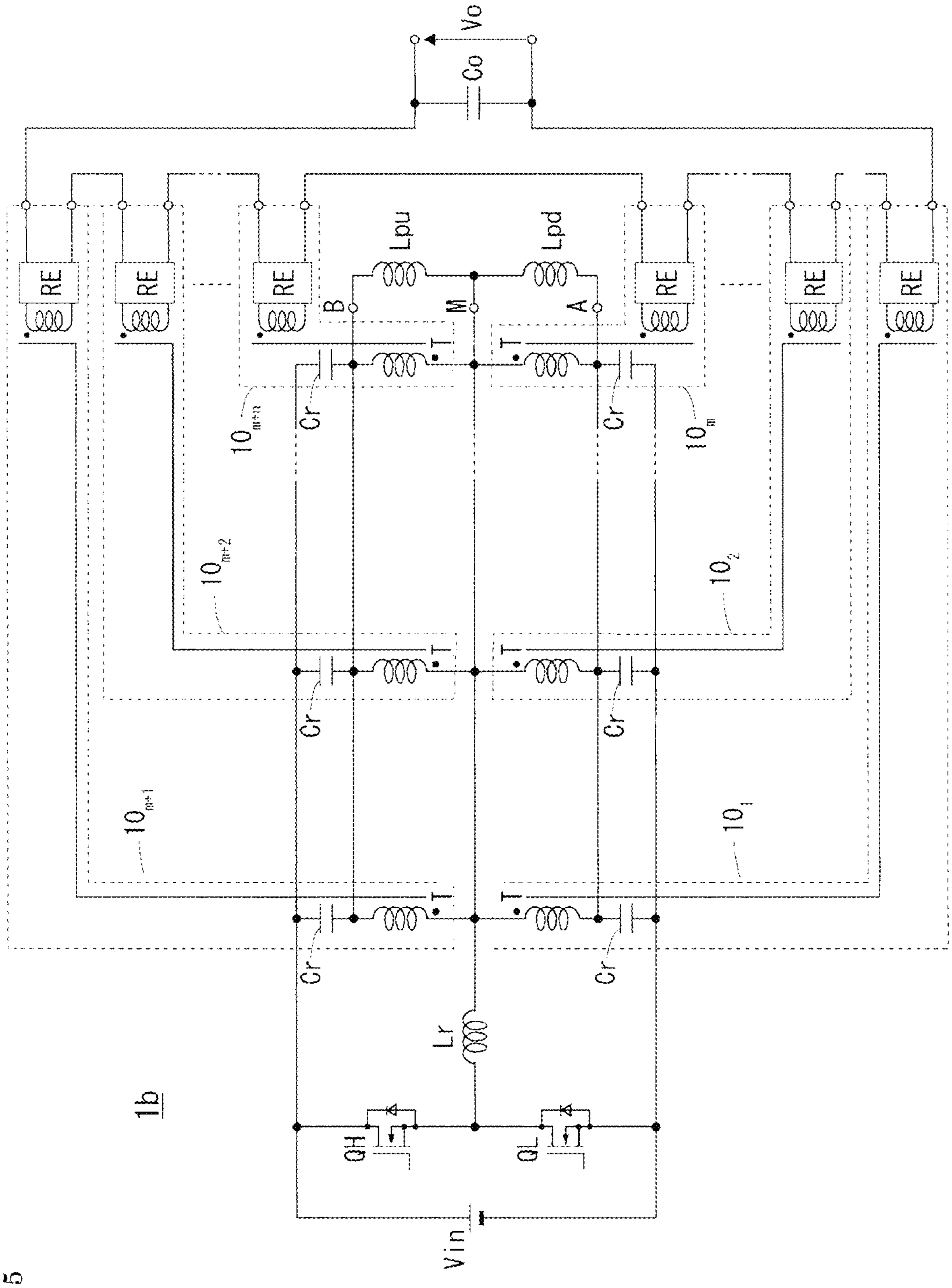
FIG. 5 is a view illustrating a configuration example in which outputs of conversion circuits are connected in series.

In a resonant converter 1*b* illustrated in FIG. 5, outputs of the m+n conversion circuits $\mathbf{10}_1$ to $\mathbf{10}_{m+n}$ are connected in series, and the output capacitor Co is collectively connected to the overall output Vo. The adjustment inductor Lpd and the adjustment inductor Lpu may be the independent inductors or the coupling inductor. The output capacitor Co may be divided and connected to each of the m+n conversion circuits $\mathbf{10}_1$ to $\mathbf{10}_{m+n}$. The resonant converter 1*b* can easily achieve the large voltage of the output by connecting the outputs from the m+n conversion circuits $\mathbf{10}_1$ to $\mathbf{10}_{m+n}$ in series.

Figure 6:
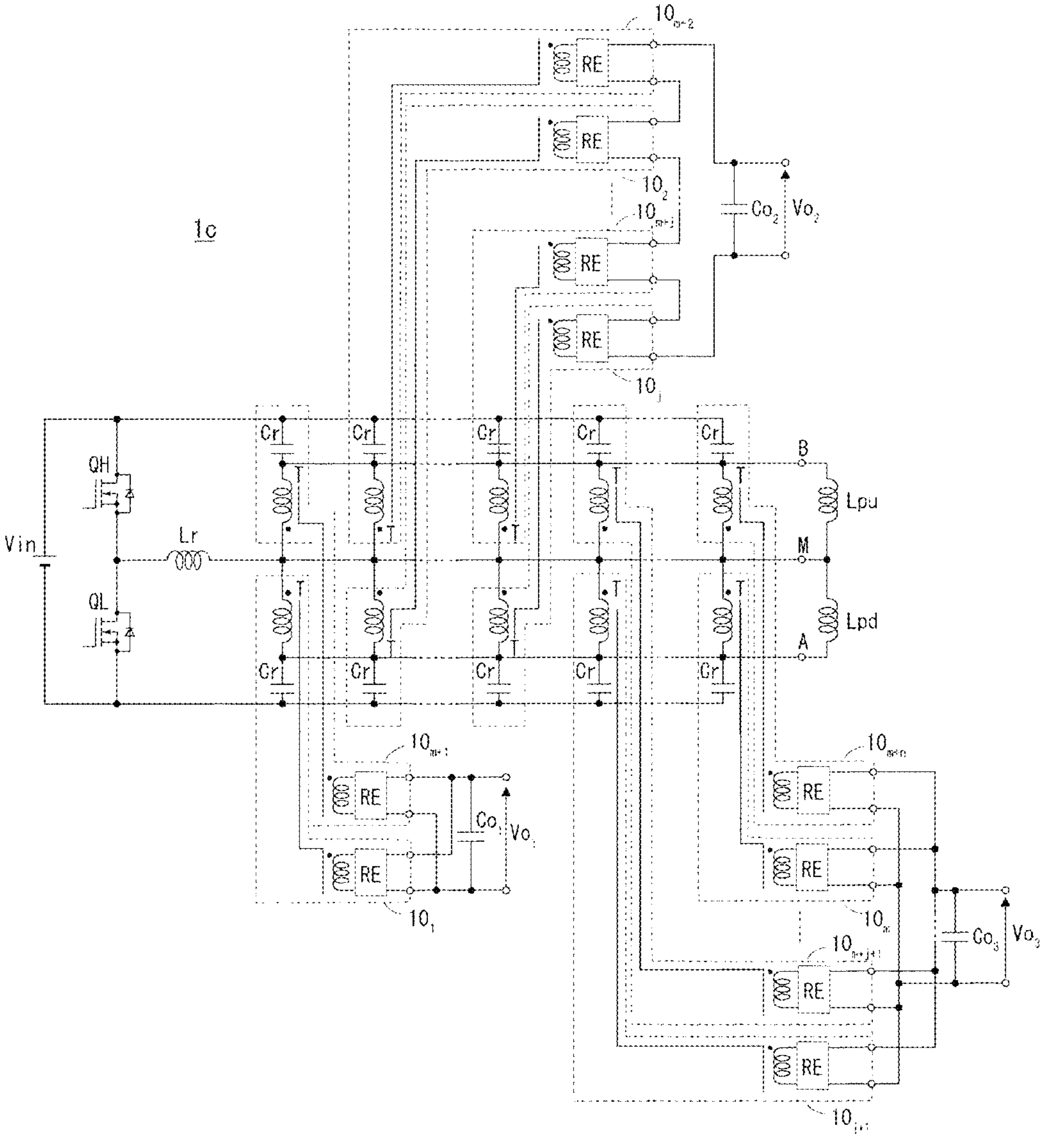
FIG. 6 is a view illustrating a configuration example of a multi-output converter.

A resonant converter 1$c$ in FIG. 6 is a multi-output converter that implements multi-output ($Vo_1$, $Vo_2$, $Vo_3$) in which parallel output and series output are mixed by distributing the mtn conversion circuits $\mathbf{10}_1$ to $\mathbf{10}_{m+n}$ into three sets. The resonant converter 1$c$ includes a first output circuit in which the lower conversion circuit $\mathbf{10}_1$ and the upper conversion circuit $\mathbf{10}_{m+1}$ are connected in parallel and that outputs the output $Vo_1$. The resonant converter 1$c$ includes a second output circuit in which the lower conversion circuits $\mathbf{10}_{2\ to\ j}$ and the upper conversion circuits $\mathbf{10}_{m+1\ to\ m+j}$ are connected in series to output the output $Vo_2$. The resonant converter 1$c$ includes a third output circuit in which the lower conversion circuits $\mathbf{10}_{j+1\ to\ m}$ and the upper conversion circuits $\mathbf{10}_{m+j+1\ to\ m}$+n are connected in parallel to output the output $Vo_3$. j is an integer of 1 to m, n. In FIG. 6, output capacitors $Co_1$ to $Co_3$ are provided in each output circuit. The output capacitors $Co_1$ to $Co_3$ may be divided into the m+n conversion circuits $\mathbf{10}_1$ to $\mathbf{10}_{m+n}$.

The resonant converter 1$c$ can balance the currents between the conversion circuits $\mathbf{10}_1$ to $\mathbf{10}_{m+n}$ even with multiple outputs by the adjustment inductor Lpd and the adjustment inductor Lpu. The adjustment inductor Lpd and the adjustment inductor Lpu of the resonant converter 1$c$ are the independent inductors. Consequently, the number of lower conversion circuits $\mathbf{10}_{1\ to\ m}$ is the same as the number of upper conversion circuits $\mathbf{10}_{m+1\ to\ m+n}$ (m=n). A subtotal of the power output from the lower conversion circuits $\mathbf{10}_{1\ to\ m}$ and a subtotal of the power output from the upper conversion circuits $\mathbf{10}_{m+1}$ to min are set to be equal.

Because the current between the conversion circuits $\mathbf{10}_1$ to $\mathbf{10}_{m+n}$ can be balanced by the adjustment inductor Lpd and the adjustment inductor Lpu, a winding ratio of the transformer T of each output circuit may be different.

Figure 7:
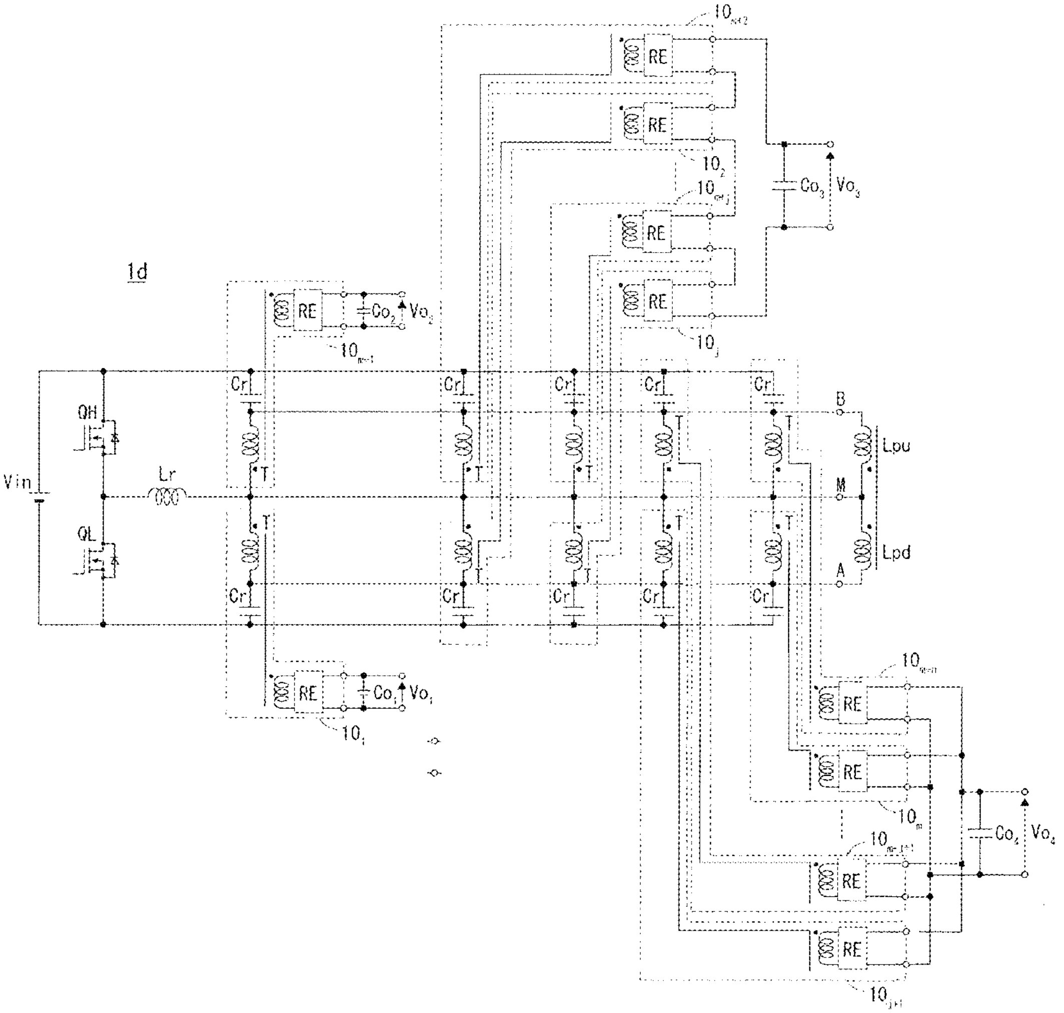
FIG. 7 is a view illustrating a configuration example of a multi-output converter.

A resonant converter 1$d$ in FIG. 7 is a multi-output converter that implements multi-output ($Vo_1$, $Vo_2$, $Vo_3$, $Vo_4$) in which single output, parallel output, and series output are mixed by distributing the m+n conversion circuits $\mathbf{10}_1$ to $\mathbf{10}_{m+n}$ into four sets. The resonant converter 1$d$ includes the lower conversion circuit $\mathbf{10}_1$ that outputs the output $Vo_1$ as the first output circuit. The resonant converter 1$d$ includes the upper conversion circuit $\mathbf{10}_{m+1}$ that outputs the output $Vo_2$ as the second output circuit. The resonant converter 1$d$ includes the third output circuit in which the lower conversion circuits $\mathbf{10}_{2\ to\ j}$ and the upper conversion circuits $\mathbf{10}_{m+1\ to\ m+j}$ are connected in series to output the output $Vo_3$. The resonant converter 1$d$ includes a fourth output circuit in which the lower conversion circuits $\mathbf{10}_{j+1\ to\ m}$ and the upper conversion circuits $\mathbf{10}_{m+j+1\ to\ m+n}$ are connected in parallel to output the output $Vo_4$. In FIG. 6, output capacitors $Co_1$ to $Co_4$ are provided in each output circuit. The output capacitors $Co_1$ to $Co_4$ may be divided into the m+n conversion circuits $\mathbf{10}_1$ to $\mathbf{10}_{m+n}$.

The adjustment inductor Lpd and the adjustment inductor Lpu of the resonant converter 1$d$ are the coupling inductor. Consequently, the number of lower conversion circuits $\mathbf{10}_{1\ to\ m}$ and the number of upper conversion circuits $\mathbf{10}_{m+1}$ to min may be different (m≠n). In each output circuit, even when the number of conversion circuits used from the lower conversion circuits $\mathbf{10}_{1\ to\ m}$ and the upper conversion circuits $\mathbf{10}_{m+1}$ to min is different between the upper and lower sides, or even when the subtotal of the power output from the conversion circuits is different between the upper and lower sides, the currents between the conversion circuits $\mathbf{10}_1$ to $\mathbf{10}_{m+n}$ can be balanced.

Because the current between the conversion circuits $\mathbf{10}_1$ to $\mathbf{10}_{m+n}$ can be balanced by the adjustment inductor Lpd and the adjustment inductor Lpu, a winding ratio of the transformer T of each output circuit may be different.

Figure 8:
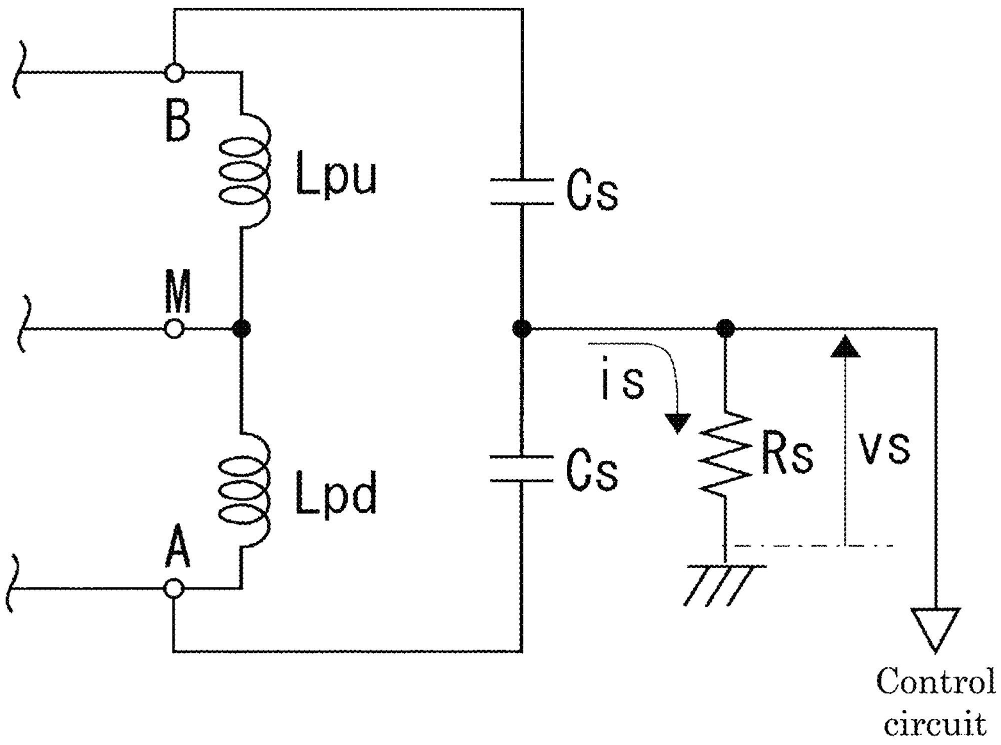
FIG. 8 is a view illustrating a configuration example of a current detection circuit that detects current flowing through a resonant inductor.

The resonant converters 1 to 1$d$ include the external terminals M, A, B that connect the adjustment inductor Lpd and the adjustment inductor Lpu as the external inductors. The external terminals A, B can be used as the connection terminal of a current detection circuit 2 in FIG. 8.

The current detection circuit 2 includes two shunt capacitors Cs connected in series between the external terminals A, B. The shunt capacitor Cs is set to have capacitance that is sufficiently smaller than that of the resonant capacitor Cr so as not to affect the operation of the resonant converter 1. The current detection circuit 2 includes a detection resistor Rs connected between a connection point of two shunt capacitors Cs and the negative electrode of the DC power supply Vin. Current is flowing through the detection resistor Rs is shunted by a resonant inductor current between the m+n resonant capacitors Cr and the two shunt capacitors Cs. Voltage vs generated in the detection resistor Rs by the current is is input as a current detection value to a control unit that performs on and off control of the upper switch element QH and the lower switch element QL.

The current is flowing through the detection resistor Rs is determined by a capacitance ratio between the resonant capacitor Cr and the shunt capacitor Cs regardless of the number of conversion circuits $\mathbf{10}_1$ to $\mathbf{10}_{m+n}$. Consequently, the current detection circuit 2 can easily detect the current flowing through the resonant inductor Lr. One current detection circuit 2 may be provided regardless of the number of conversion circuits $\mathbf{10}_1$ to $\mathbf{10}_{m+n}$, and a gain setting of the control circuit is not required to be changed according to the number of conversion circuits $\mathbf{10}_1$ to $\mathbf{10}_{m+n}$.

As described above, the embodiment includes the upper switch element QH and the lower switch element QL that are connected in series to both ends of the DC power supply Vin. The embodiment includes the resonant inductor Lr including one end connected to the connection point between the upper switch element QH and the lower switch element QL. The embodiment includes the m lower conversion circuits $\mathbf{10}_{1\ to\ m}$ including the transformer T including the primary winding T1 and the secondary winding T2, the resonant capacitor Cr connected in series to the primary winding T1, and the rectifier RE connected to both ends of the secondary winding T2. In the m lower conversion circuits $\mathbf{10}_{1\ to\ m}$, the primary winding T1 and the resonant capacitor Cr are connected between the other end of the resonant inductor Lr and the negative electrode of the DC power supply Vin, and configure the LLC resonant converter that operates by the on and off operations of the upper switch element QH and the lower switch element QL together with the resonant inductor Lr. The embodiment includes the n upper conversion circuits $\mathbf{10}_{m+1\ to\ m+n}$ including the transformer T, the resonant capacitor Cr, and the rectifier RE. In the n upper conversion circuits $\mathbf{10}_{m+1}$ to min, the primary winding T1 and the resonant capacitor Cr are connected between the other end of the resonant inductor Lr and the positive electrode of the DC power supply Vin, and configure the LLC resonant converter that operates by on and off operations of the upper switch element QH and the lower switch element QL together with the resonant inductor Lr. The embodiment includes the adjustment inductor Lpd (lower adjustment inductor) connected in parallel with the primary windings T1 of the m lower conversion circuits $\mathbf{10}_{1\ to\ m}$. The embodiment includes the adjustment inductor Lpu (upper adjustment inductor) connected in parallel with the primary windings T1 of the n lower conversion circuits $\mathbf{10}_{1\ to\ m}$.

With this configuration, the currents are balanced even when the lower conversion circuits $10_{1\ to\ m}$ and the upper conversion circuits $10_{m+1}$ to min are extended in parallel, so that the large power or the high integration can be easily achieved.

Furthermore, in the embodiment, the adjustment inductor Lpd and the adjustment inductor Lpu can be the coupling inductor.

With this configuration, even when the number of lower conversion circuits $10_{1\ to\ m}$ is different from the number of upper conversion circuits $10_{m+1\ to\ m+n}$ (even when m/n), the currents can be balanced among the m+n conversion circuits $10_1$ to $10_{m+n}$. The adjustment inductor Lpd and the adjustment inductor Lpu can reduce variations in inductance. The number of cores used for the adjustment inductor Lpd and the adjustment inductor Lpu may be one. The numbers of windings of the adjustment inductor Lpd and the adjustment inductor Lpu can be reduced as compared with the case of the independent inductor.

Furthermore, according to the embodiment, the excitation inductances of the transformers T of the lower conversion circuits $10_{1\ to\ m}$ and the upper conversion circuits $10_{m+1\ to\ m+n}$ are set to be larger than the inductances of the adjustment inductor Lpd and the adjustment inductor Lpu, the gapless core can be used for the transformer T.

Furthermore, in the resonant converter 1*a*, the outputs of the m lower conversion circuits $10_{1\ to\ m}$ and the outputs of the n upper conversion circuits $10_{m+1\ to\ m+n}$ are connected in parallel.

With this configuration, the resonant converter 1*a* can easily achieve the large current of the output.

Furthermore, in the resonant converter 1*b*, the outputs of the m lower conversion circuits $10_{1\ to\ m}$ and the outputs of the n upper conversion circuits $10_{m+1}$ to min are connected in series.

With this configuration, the resonant converter 1*b* can easily achieve the large voltage of the output.

Furthermore, the resonant converters 1*c*, 1*d* are the multi-output converters in which the outputs of the m lower conversion circuits $10_{1\ to\ m}$ and the outputs of the n upper conversion circuits $10_{m+1\ to\ m+n}$ are divided into a plurality of sets.

With this configuration, the resonant converters 1*c*, 1*d* can easily cope with multiple outputs.

Furthermore, the embodiment includes the external terminal M (intermediate external terminal) connected to the connection point between the other end of the resonant inductor Lr and one end of the primary winding T1 of the lower conversion circuits $10_{1\ to\ m}$ and the upper conversion circuits $10_{m+1\ to\ m+n}$. The embodiment includes the external terminal A (lower external terminal) connected to the connection point between the other end of the primary winding T1 of each of the lower conversion circuits $10_{1\ to\ m}$ and one end of the resonant capacitor Cr. The embodiment includes the external terminal B (upper external terminal) connected to the connection point between the other end of the primary winding T1 of the upper conversion circuits $10_{m+1\ to\ m+n}$ and one end of the resonant capacitor Cr. The adjustment inductor Lpd is connected as the external inductor between the external terminal M and the external terminal A, and the adjustment inductor Lpu is connected as the external inductor between the external terminal M and the external terminal B.

With this configuration, the adjustment inductor Lpd and the adjustment inductor Lpu can easily adjust the inductance. The external terminals A, B can be used as the terminal for the connection of the current detection circuit 2, and the current flowing through the resonant inductor Lr can be easily detected by the current detection circuit 2.

Although the present invention has been described above with reference to the specific embodiment, it is needless to say that the above-described embodiment is the example and can be modified and implemented without departing from the spirit of the present invention.

The invention claimed is:

1. A resonant converter comprising:

an upper switch element and a lower switch element that are connected in series between a positive electrode and a negative electrode of a DC power supply;

a resonant inductor including one end connected to a connection point between the upper switch element and the lower switch element;

m, where m is an integer greater than or equal to 2, lower conversion circuits each of which includes a transformer including a primary winding and a secondary winding, a resonant capacitor connected in series to the primary winding, and a rectifier connected to both ends of the secondary winding, the m lower conversion circuits configuring a first LLC resonant converter in which the primary winding and the resonant capacitor are connected between another end of the resonant inductor and the negative electrode of the DC power supply, the first LLC resonant converter operating by on and off operations of the upper switch element and the lower switch element together with the resonant inductor;

n, where n is an integer greater than or equal to 2, upper conversion circuits each of which includes a transformer, a resonant capacitor, and a rectifier, the n upper conversion circuits configuring a second LLC resonant converter in which a primary winding and the resonant capacitor are connected between the other end of the resonant inductor and the positive electrode of the DC power supply, the second LLC resonant converter operating by the on and off operation of the upper switch element and the lower switch element together with the resonant inductor;

a lower adjustment inductor connected in parallel with the primary windings of the m lower conversion circuits;

an upper adjustment inductor connected in parallel with the primary windings of the n upper conversion circuits;

an intermediate external terminal connected to a connection point between the other end of the resonant inductor and one end of the primary winding of each of the upper conversion circuit and the lower conversion circuit;

a lower external terminal connected to a connection point between another end of the primary winding of the lower conversion circuit and one end of the resonant capacitor of the lower conversion circuit; and an upper external terminal connected to a connection point between another end of the primary winding of the upper conversion circuit and one end of the resonant capacitor of the upper conversion circuit, wherein the lower adjustment inductor is connected as an external inductor between the intermediate external terminal and the lower external terminal, and the upper adjustment inductor is connected as an external inductor between the intermediate external terminal and the upper external terminal.

2. The resonant converter according to claim 1, wherein the lower adjustment inductor and the upper adjustment inductor are a coupling inductor.

3. The resonant converter according to claim 2, wherein excitation inductances of the transformers of the lower conversion circuit and the upper conversion circuit are set to be larger than inductances of the lower adjustment inductor and the upper adjustment inductor.

4. The resonant converter according to claim 3, wherein the excitation inductances of the transformers of the lower conversion circuit and the upper conversion circuit are set greater than or equal to 10 times the inductances of the lower adjustment inductor and the upper adjustment inductor.

5. The resonant converter according to claim 2, wherein outputs of the m lower conversion circuits and outputs of the n upper conversion circuits are connected in parallel.

6. The resonant converter according to claim 2, wherein outputs of the m lower conversion circuits and outputs of the n upper conversion circuits are connected in series.

7. The resonant converter according to claim 2, wherein the resonant converter is a multi-output converter in which outputs of the m lower conversion circuits and outputs of the n upper conversion circuits are divided into a plurality of sets.

8. The resonant converter according to claim 2, further comprising a current detection circuit that is connected between a connection point between the primary winding of the lower conversion circuit and the resonant capacitor of the lower conversion circuit and a connection point between the primary winding of the upper conversion circuit and the resonant capacitor of the upper conversion circuit, and detects current flowing through the resonant inductor.

9. The resonant converter according to claim 1, wherein excitation inductances of the transformers of the lower conversion circuit and the upper conversion circuit are set to be larger than inductances of the lower adjustment inductor and the upper adjustment inductor.

10. The resonant converter according to claim 9, wherein the excitation inductances of the transformers of the lower conversion circuit and the upper conversion circuit are set greater than or equal to 10 times the inductances of the lower adjustment inductor and the upper adjustment inductor.

11. The resonant converter according to claim 1, wherein outputs of the m lower conversion circuits and outputs of the n upper conversion circuits are connected in parallel.

12. The resonant converter according to claim 1, wherein outputs of the m lower conversion circuits and outputs of the n upper conversion circuits are connected in series.

13. The resonant converter according to claim 1, wherein the resonant converter is a multi-output converter in which outputs of the m lower conversion circuits and outputs of the n upper conversion circuits are divided into a plurality of sets.

14. The resonant converter according to claim 1, further comprising a current detection circuit that is connected between a connection point between the primary winding of the lower conversion circuit and the resonant capacitor of the lower conversion circuit and a connection point between the primary winding of the upper conversion circuit and the resonant capacitor of the upper conversion circuit, and detects current flowing through the resonant inductor.

* * * * *